J. & G. H. BLISS.
REGISTERING SHIP'S LOG.
No. 10,625. Reissued July 21, 1885.
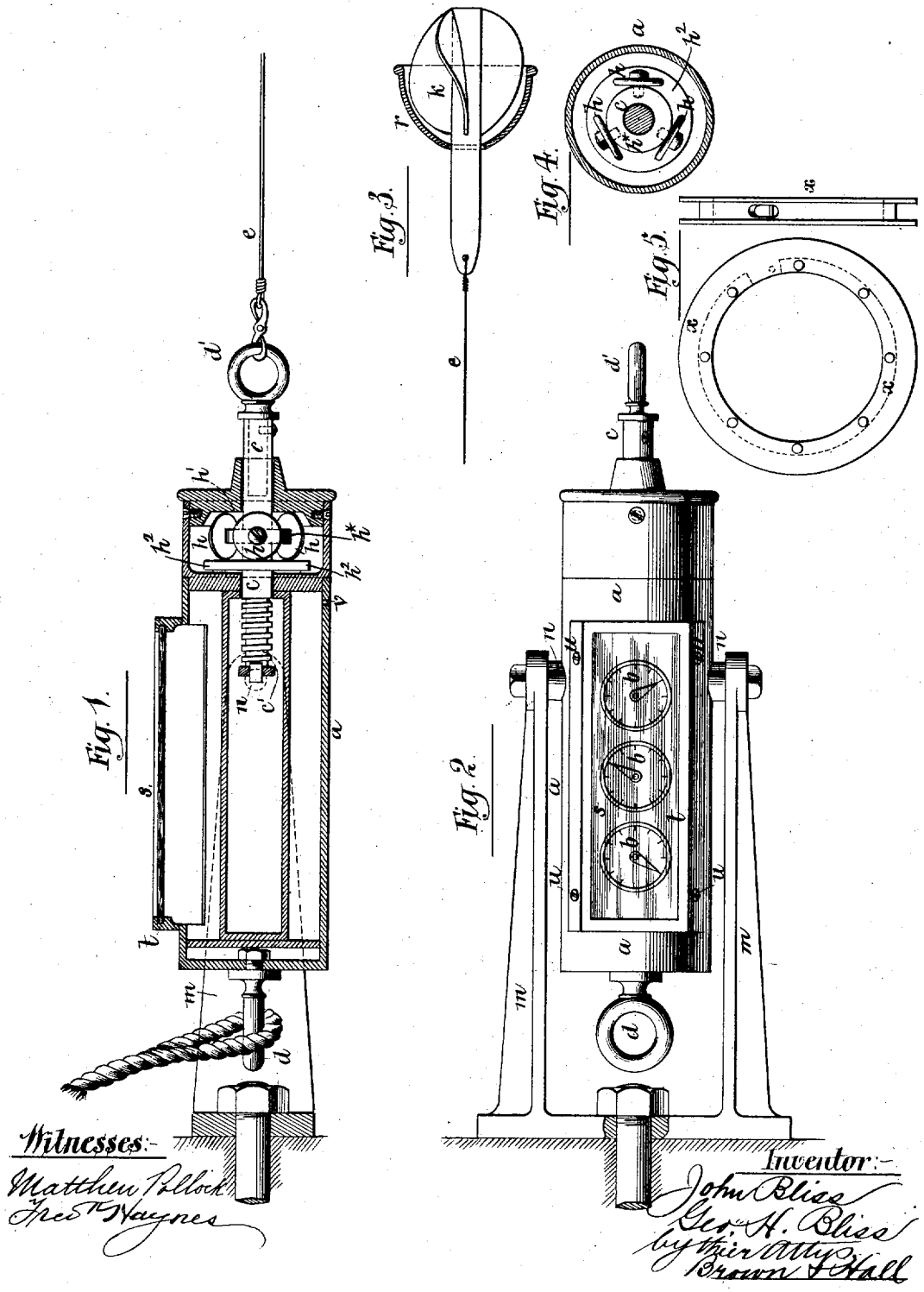
N. PETERS, Photo-Lithographer, Washington, D. C.

UNITED STATES PATENT OFFICE.

JOHN BLISS AND GEORGE H. BLISS, OF BROOKLYN, NEW YORK.

REGISTERING SHIP'S LOG.

SPECIFICATION forming part of Reissued Letters Patent No. 10,625, dated July 21, 1885.

Original No. 178,261, dated June 6, 1876. Application for reissue filed April 7, 1884.

*To all whom it may concern:*

Be it known that we, JOHN BLISS and GEORGE H. BLISS, of Brooklyn, in the county of Kings and State of New York, have invented an Improvement in Ships' Logs, of which the following is a specification.

Ships' logs have been made with a registering mechanism in a circular or drum form connected with the vessel, and from this a line passes to the propeller in the water. This form is expensive and cumbersome. Logs have also been made with an elongated registering mechanism with the propeller in one apparatus, and these are fastened to a line and thrown over together. Difficulty arises in making an accurate observation and allowing for the time in paying out and drawing in the line. The elongated case and register are those mostly used; but heretofore this character of register has not been fitted at the vessel and connected to the distant propeller.

The object of our invention is to provide a log of simple and inexpensive construction, which will not be liable to get out of order, and in which the registering apparatus, in an elongated case, is attached to the vessel and connected by a line with the distant propeller or rotator.

In the drawings, Figure 1 is a vertical section of the registering mechanism. Fig. 2 is a plan of the same. Fig. 3 is an elevation of the propeller. Fig. 4 is an elevation of the anti-friction rollers and a section of the log-case, and Fig. 5 represents in side elevation and edge view a ring or reel on which may be wound the line or wire attached to the rotator or propeller, and from which the line or wire may be paid out.

The case *a* is elongated and of a general form corresponding to the register-cases that have been connected directly to the propeller. Within this case are the dials and pointers *b*, and the shaft *c* has upon it the worm or screw *c'*, that gives motion to the registering mechanism. We apply with this elongated case an eye, *d*, at one end, to which a safety-cord is to be attached to prevent loss of the register in case of accident to the suspending devices, hereinafter described; but the apparatus might be suspended by this eye alone, and an eye, *d'*, at the end of the shaft *c*, to which the line or wire of suitable material, preferably a copper wire, *e*, extending to the propeller *k*, is attached.

Within the case *a* are anti-friction rollers *h*, which are carried by a collar, $h^*$, loosely fitting the shaft *c*. Upon the shaft *c* is a fixed collar or flange, $h^2$, which bears upon the rollers *h*, and said rollers run upon the flat or nearly flat surface *h'*, and prevent the friction resulting from tension on the log-wire *e* interfering with the accuracy of the registration.

The elongated register-case is preferably sustained near its center of gravity by the gimbaling mechanism that allows the elongated case to accommodate itself to the line of tension of the wire *e*, so that the bearing of the shaft *c* will be relieved from as much friction as possible.

The yoke *m* is connected by the pivot-studs *n* to the case *a*, and when the register is to be sustained upon the rail of the vessel said yoke *m* will terminate in a vertical pivot that enters a socket, forming a gimbal and swivel. It will, however, generally be preferable to have this yoke *m* long enough to occupy a horizontal position, as shown, so that the log can be attached at the stern of the vessel to a horizontal bolt, or when the yoke or bail of the log is to be attached to the vessel by a rope an eye is to be provided at the end of the yoke or bail in lieu of the hole for the bolt, and the log will be loosely slung to the vessel.

This attachment is very convenient and reliable, and the registering mechanism can be placed out of the way of ropes and chains in a position where it may remain a fixture.

In drawing in the propeller, the rope or wire is frequently snapped from the twisting action of the propeller while still in the water. This is augmented by the jerks that are often given in carelessly pulling in the propeller. We prevent the rotation of the propeller when it is being drawn in, by a conoidal messenger, *r*, of thin sheet metal or other suitable material that is allowed to run down the rope or wire *e*, and sufficiently inclose or shield the front end of the propeller-blades to prevent them receiving the rotary motion in drawing through the water. This messenger has a central hole for the wire, and it may be split at one side and sprung open to allow of its being placed upon or taken off the wire *e*.

The glass *s* is secured within the metal frame *t*, and this frame is curved on the inner side to correspond to the curvature of the cylindrical case *a*, and screws *u* are employed to connect the frame and case. By using this glass and cement between the surfaces, the registering mechanism within the case *a* can be kept free from water, instead of being constantly wet, as heretofore. A small hole at *v* allows any moisture or condensation to escape.

The wire that leads from the vessel must be kept from sudden bends or kinks in winding and unwinding; otherwise the wire is liable to be broken or to twist off by the revolution of the propeller. To prevent injury to the wire in winding up or unwinding, we provide a reel in the form of a ring, *x*, grooved upon its periphery to receive the wire. This ring is handled in winding up or letting off the wire, as the ring is of a size and shape to be grasped by the hands, and does not have any shaft or support; hence the winding is entirely in the hands of the operator. Fig. 5 represents said winding-ring by a side view and elevation. This grooved ring is preferably a trough-shaped ring of cast or sheet metal; but it may be partially of wood.

It is advantageous to have the case of elongated form, because the train of wheel-work to be used therein can consist simply of spur-wheels and pinions, and the three dials and their indices can be arranged in line, as shown in Fig. 2; but a single worm or screw, *c'*, is then required in the registering apparatus; hence the train of wheel-work will be less expensive and work with less friction than when a number of worms or screws are necessarily employed.

We claim as our invention—

1. The elongated case *a*, with an eye at one end for a safety cord or chain, in combination with the shaft or spindle projecting from the other end, and connected by the wire or rope *e* with the propeller *k*, substantially as set forth.

2. An elongated cylindrical case containing the registering mechanism, with the shaft *c* introduced axially at one end, in combination with the anti-friction rollers *h*, eye *d'*, propeller, and connecting cord or wire, substantially as set forth.

3. The horizontal attaching-yoke *m*, in combination with the elongated case *a*, registering mechanism *b*, and shaft *c*, substantially as set forth.

4. The glass *s* and metal frame *t*, curved upon its lower surface to the arc of a circle, in combination with the elongated cylindrical case *a*, and registering mechanism, as set forth.

5. The combination, with the propeller of a ship's log, of a messenger-shield, *r*, constructed substantially as and for the purpose set forth.

JOHN BLISS.
GEO. H. BLISS.

Witnesses:
C. B. C. FOWLER,
JOHN L. BLISS.